United States Patent
Kappes et al.

(10) Patent No.: US 7,403,773 B2
(45) Date of Patent: Jul. 22, 2008

(54) LOCATION-BASED ACCESS CONTROL FOR WIRELESS LOCAL AREA NETWORKS

(75) Inventors: Martin Kappes, Bridgewater, NJ (US);
Sachin Garg, Green Brook, NJ (US);
Mahalingam Mani, Sunnyvale, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 394 days.

(21) Appl. No.: 10/180,527

(22) Filed: Jun. 27, 2002

(65) Prior Publication Data

US 2004/0203748 A1    Oct. 14, 2004

(51) Int. Cl.
*H04Q 7/20* (2006.01)
*H04M 11/04* (2006.01)

(52) U.S. Cl. .............. 455/432.1; 455/404.2; 455/435.1; 455/456.1; 455/456.2; 455/456.3

(58) Field of Classification Search .............. 455/404.2, 455/456.1–5, 432.1, 435.1, 456.2, 456.3; 342/386, 463–5
See application file for complete search history.

(56) References Cited

U.S. PATENT DOCUMENTS

| | | | | |
|---|---|---|---|---|
| 5,428,821 A * | 6/1995 | Krisna et al. | ................ | 455/522 |
| 5,794,141 A * | 8/1998 | Zicker | ........................ | 455/418 |
| 5,835,061 A | 11/1998 | Stewart | | |
| 5,907,808 A * | 5/1999 | Vaara et al. | .................. | 455/441 |
| 5,995,253 A * | 11/1999 | Flaherty | ...................... | 398/36 |
| 6,011,973 A * | 1/2000 | Valentine et al. | ............ | 455/456 |
| 6,195,558 B1 * | 2/2001 | Griffith et al. | ............ | 455/456.5 |
| 6,285,884 B1 * | 9/2001 | Vaara | ........................ | 455/441 |
| 6,307,471 B1 * | 10/2001 | Xydis | ...................... | 340/568.1 |
| 6,697,018 B2 * | 2/2004 | Stewart | ...................... | 342/386 |
| 7,072,652 B2 * | 7/2006 | Stephens | .................. | 455/432.1 |
| 7,286,474 B2 * | 10/2007 | Garg et al. | .................. | 370/230 |
| 2001/0027120 A1 * | 10/2001 | Ihara | .......................... | 455/555 |

(Continued)

FOREIGN PATENT DOCUMENTS

GB          2339994 A   *   2/2000

OTHER PUBLICATIONS

Berzins, A. "I/O Software and Bluesoft Show Innovative Authentication Solution at the Intel Developer Forum", Press Release, 'Online!, Feb. 25, 2002, pp. 1-2, XP002250194.

(Continued)

*Primary Examiner*—Barry W Taylor
(74) *Attorney, Agent, or Firm*—Muncy, Geissler, Olds & Lowe, PLLC (57) ABSTRACT

A wireless local area network (LAN), and a method of operating the same, prevents unauthorized users from accessing the wireless LAN. A signal strength of a station attempting to access the wireless LAN is measured. If the signal strength is less than a predetermined threshold value, the system concludes that the station is outside of an authorized geographical area. Such a station attempting to establish a connection is characterized as an unauthorized station, and access to the wireless LAN is denied. The system may also periodically verify that authorized stations remain within the authorized geographical area. A station that has moved outside of the authorized geographical area can be notified or denied further access to the wireless LAN.

14 Claims, 5 Drawing Sheets

U.S. PATENT DOCUMENTS

| | | | |
|---|---|---|---|
| 2001/0041567 A1* | 11/2001 | Morgan | 455/433 |
| 2003/0100309 A1* | 5/2003 | Hull | 455/450 |
| 2003/0119446 A1* | 6/2003 | Fano et al. | 455/41 |
| 2004/0192294 A1* | 9/2004 | Pan et al. | 455/432.1 |
| 2004/0203846 A1* | 10/2004 | Caronni et al. | 455/456.1 |

OTHER PUBLICATIONS

Kindberg, T. et al., "Context Authentication Using Constrained Channels", Proceedings Fourth IEEE Workshop on Mobile Computing Systems and Applications, Jun. 20, 2002, pp. 14-21, XP002250195.

IBM: "IBM researchers demonstrate industry's first Self-diagnostic wireless security monitoring tool", Press Release, 'Online!, Jun. 21, 2002, pp. 1-2, XP002250196.

Garg, S. et al., "Wireless access server for quality of service and location based access control in 802.11 networks", Proceedings ISCC 2002 7$^{th}$ Int'l Symp on Computers and Communication, Jul. 1, 2002, pp. 819-824, XP010595853.

Banerjee, S. et al., "Secure Spaces: Location-based Secure Wireless Group Communication", Mobile Computer and Communications Review, 'Online!, vol. 1, No. 2, Oct. 2, 2002, XP002250197.

\* cited by examiner

LOCATION-BASED ACCESS CONTROL FOR WIRELESS LOCAL AREA NETWORKS

BACKGROUND OF THE INVENTION

1. Field of the Invention

The present invention relates to a wireless, local area network (LAN). More particularly, the present invention relates to a system and method for preventing unauthorized use of a wireless LAN.

2. Description of the Related Art

Wireless LANs are a popular and inexpensive way to allow multiple users of "stations" to communicate with each other, to access a wired LAN, to access a local server, to access a remote server, such as over the Internet, etc. A "station" is a piece of equipment, such as a laptop computer, a personal digital assistant (PDA), a pager, a cellular phone, or similar device. The station includes a wireless transceiver which can communicate with an access point. The communication can occur via radio waves, infrared, or any other known form of wireless communication. The access point allows wireless stations to communicate with each other and to communicate with infrastructure connected to the access point.

The server can provide services, such as access to applications like an email system, a word processing program, an accounting system and/or a dedicated database. Wireless LANs are employed within such facilities as businesses, university classrooms or buildings, airport lounges, hotel meeting rooms, etc. When a user is physically located in the vicinity of an access point, the transceiver of the station communicates with the access point and a connection to the wireless LAN is established.

One problem with wireless LANs is unauthorized users. An unauthorized user can position an unauthorized station on the outskirts of the transmission/reception area of the access point, such as in a parking lot, and "hack" into the wireless LAN. The unauthorized user can then use the LAN services without paying a subscriber fee. This leads to lost revenues and slows down the applications for the authorized subscribers. More importantly, the unauthorized user can often gain access to sensitive data, and/or can cause destruction or corruption of application programs and data on the wireless LAN.

One solution to unauthorized users of wireless LANs has been to employ user names and passwords. Such a measure is successful to some extent. However, sophisticated hackers can still bypass user name and password protection systems. Since transmissions between the stations and the access point are wireless, it is possible to intercept a transmission, as an authorized users logs on, to decode a key code, the valid user name and password, and to then break into the wireless LAN. Further, other more sophisticated techniques are available. Therefore, there exists a need in the art for a system and method, which assists in preventing unauthorized users from gaining access to a wireless LAN.

SUMMARY OF THE INVENTION

It is an object of the present invention to address one or more of the drawbacks associated with the related art.

It is a further object of the present invention to enhance the security of a wireless LAN.

These and other objects are accomplished by a system pertaining to, and a method of operating, a wireless LAN, which prevents unauthorized users from accessing the wireless LAN. A signal strength of a station attempting to access the wireless LAN is measured. If the signal strength is less than a predetermined threshold value, the system concludes that the station is outside of an authorized geographical area. Such a station attempting to establish a connection is characterized as an unauthorized station, and access to the wireless LAN is denied. The system may also periodically verify that authorized stations remain within the authorized geographical area. A station that has moved outside of the authorized geographical area can be notified or denied further access to the wireless LAN.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
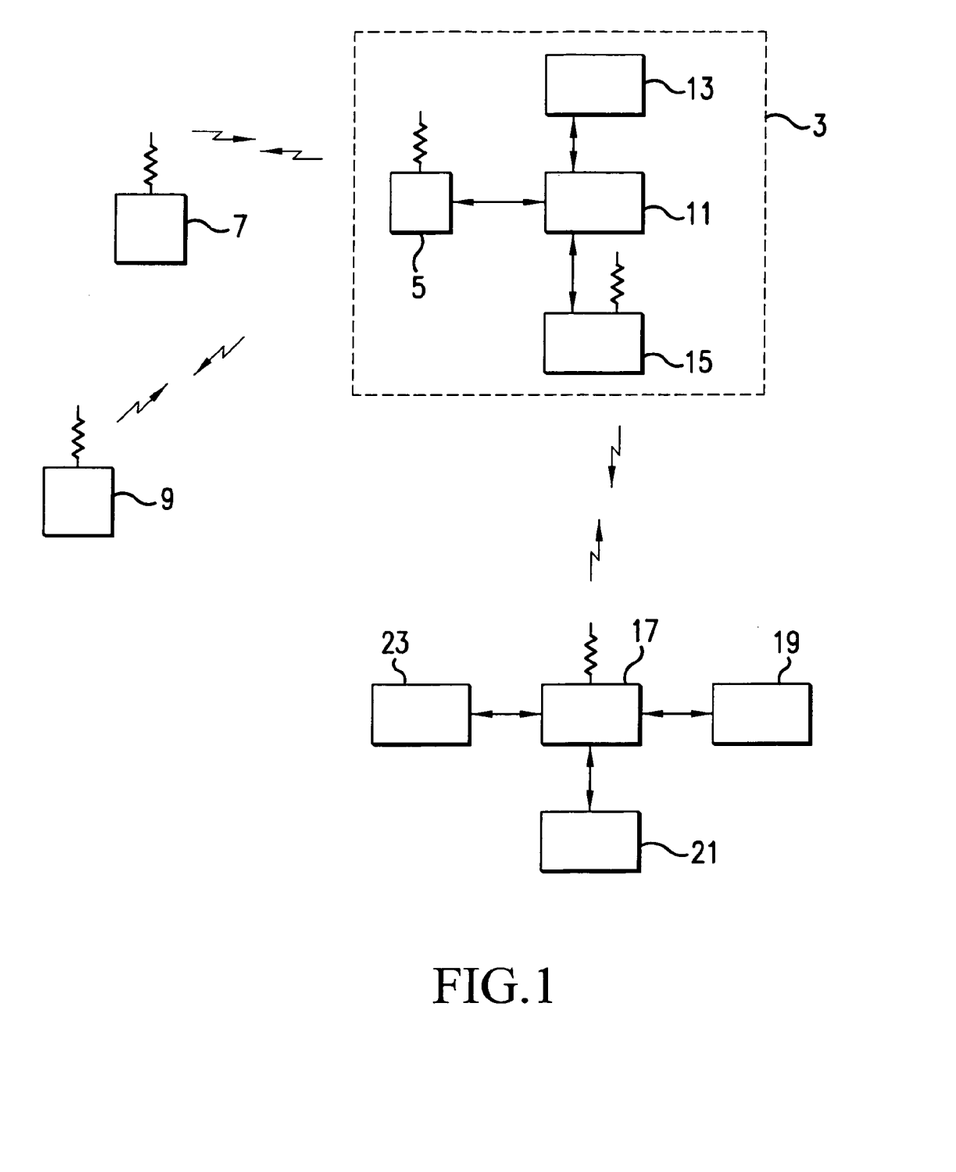
FIG. 1 is a block diagram illustrating a wireless LAN, in accordance with the present invention.

FIG. 1 is a block diagram illustrating a wireless LAN, in accordance with the present invention. The wireless LAN includes at least one access point 3. The access point 3 includes a wireless transceiver 5. The wireless transceiver communicates with wireless stations 7 and 9 in the vicinity.

The transceiver 5 is connected to a control unit 11. The control unit 11 is connected to a memory 13 and a bridge or router 15. The router 15 is connected to a server 17, either via a hardwired connection or via a wireless connection (as illustrated in FIG. 1). The server 17 is, in turn, connected to peripheral devices, such as a printer 19, a modem 21 and a database 23. It should be noted that the bridge or router 15 need not be directly connected to a local server. A server could be anywhere in the Intranet, or Internet, if a suitable network configuration is provided. The primary function of the access point is to act as a bridge to allow communications between wireless stations (in which case a server is not required) and/or to allow communications between wireless stations and some infrastructure connected to the access point (which may or may not include a server).

Figure 2:
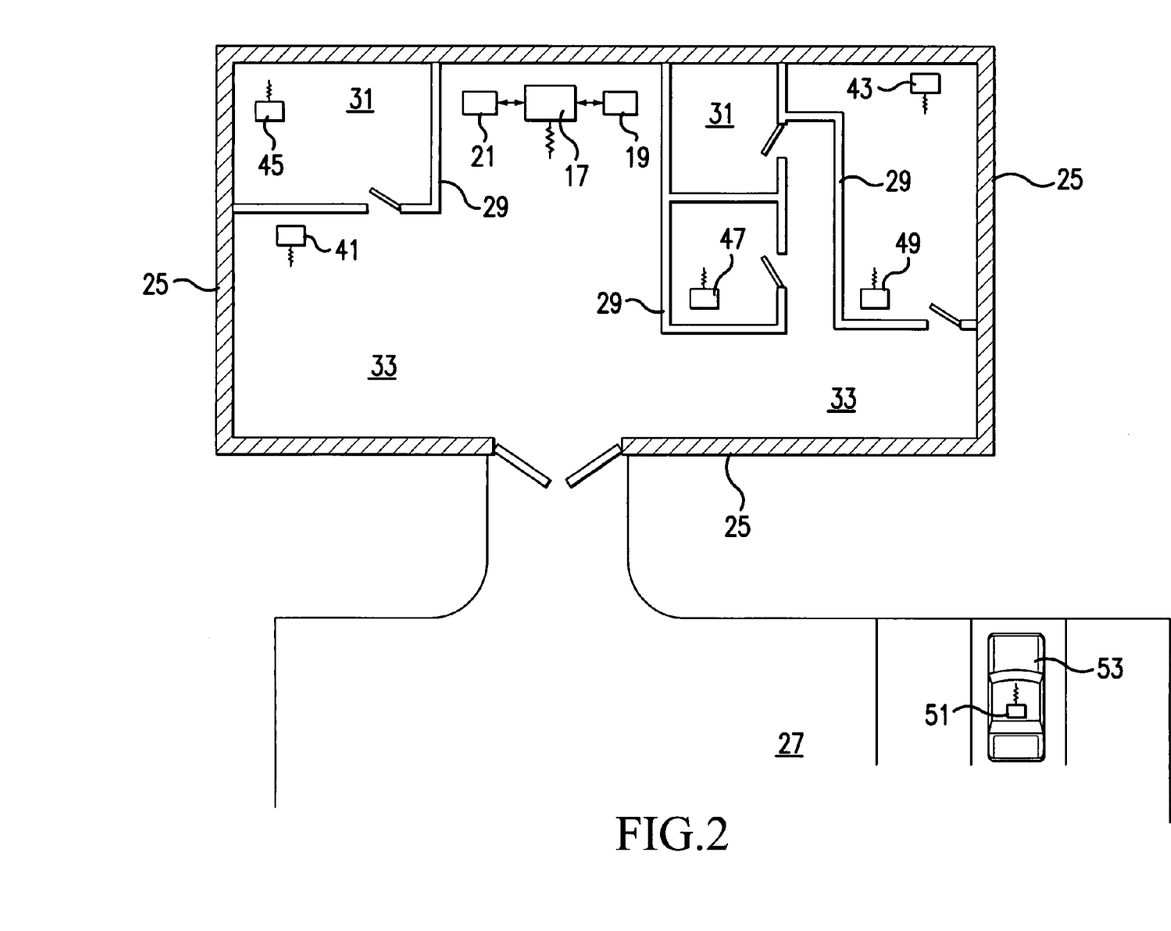
FIG. 2 is a floor plan of a business employing the wireless LAN.

With reference to FIG. 2, a physical allocation of the wireless LAN in a small business will be described. A small business is located within a building defined by outside perimeter walls 25. A parking lot 27 is provided at the entrance to the business.

Inside the perimeter walls 25 are a plurality of interior walls 29 defining individual offices 31 and workspaces 33.

The server 17 is located in one of the workspaces 33. The server 17 has a hardwired connection to the printer 19 and the modem 21. A personnel, customer, and production database is located on a hard drive, internal to the server 17. The server 17 also includes a wireless connection to a first access point 41 and a second access point 43.

Employees of the business are provided with stations, such as laptops. The laptops are connectable to either one of the first or second access points 41, 43 via a wireless connection. Three authorized stations are illustrated, i.e. a first station 45, a second station 47 and a third station 49. Each station 45, 47, 49 will communicate with a closest access point 41, 43. Employees may take their laptops to and from various offices and workspaces without interruption of their connection to the server 17. As an authorized station 45, 47, 49 travels within the business, the station 45, 47, 49 is handed-off to a closest access point 41, 43, so that an adequate signal strength is maintained.

FIG. 2 also illustrates an unauthorized fourth station 51. The authorized fourth station 51 is located in a car 53 in the parking lot 27. The unauthorized station 51 is sufficiently close to the second access point 43 to send signals to, and receive signals from, the second access point 43. Thus, a person in the parked car 53 has the opportunity to gain access to the wireless LAN.

In a wireless LAN in accordance with the background art, this person might view sensitive personnel and business data, or corrupt program or data files with a computer virus. However, in the present invention, the system components, and method of operation, act to prevent access to the wireless LAN by the unauthorized fourth station 51.

Figure 3:
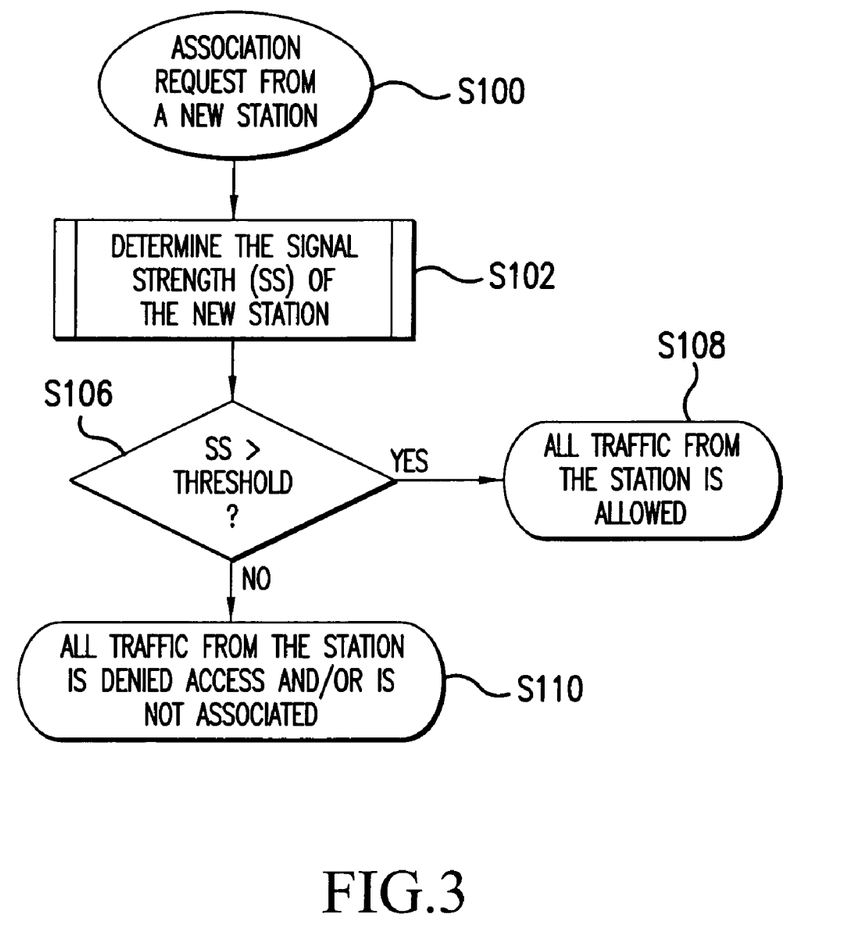
FIG. 3 is a flow chart illustrating a method for allowing a wireless station access to the wireless LAN.

With reference to the flow chart of FIG. 3, the operation of the system components, in accordance with the present invention, will be described. In step S100, an association request is received from a station seeking to connect to the wireless LAN. The request is received by the transceiver 5. The transceiver 5 passes the request to the control unit 11.

In step S102, the control unit 11 measures the signal strength (SS) of the request. Next, in Step S106, the control unit 11 compares the measured signal strength to a predetermined threshold value stored in the memory 13. If the measured signal strength is greater than the predetermined threshold value, the system concludes that the station is within the confines of the business's outer perimeter walls 25. Therefore, the process proceeds to step S108. In step S108, the control unit 11 allows the station to communicate with the server 17 or with other stations on the wireless LAN, via the router 15. Of course, key codes, user names, and passwords, may also be checked by the access point 3 or server 17 prior to allowing a station full access to the wireless LAN.

If the measured signal strength in step S102 is not greater than the predetermined threshold value (as determined by the comparison step S106), the process proceeds to step S110. In step 110, the control unit 11 prevents the station from communicating with the server 17 and with other stations on the wireless LAN by denying access to the router 15. It is also an option that the control unit 11 can send a message to the station, forming the station that it is out of range.

By the above arrangement, it is possible to prevent a wireless station from gaining access to the wireless LAN, when the station is positioned outside of a designated geographical area, such as outside of the perimeter walls 25 of the business. This will reduce the likelihood of an unscrupulous person tampering with the wireless LAN by "parking-lot hacking."

Since a wireless LAN can be installed in a business having a floor plan of any configuration or size, there would be no single predetermined threshold value which would be suitable for all installations. Therefore, it is envisioned that the predetermined threshold value would be experimentally determined at the time of installation by a technician or by the end user. During installation, a technician would take a station and travel entirely within the geographical area to be served by the access point of the wireless LAN. Measurements would be made of the signal strength of the technician's station in this geographical area to form a first set of measured signal strengths.

Next, the technician would take the station just outside the geographical area to be serviced by the access point. Signal strength measurement would be again taken, this time to form a second set of measured signal strengths. The predetermined threshold value would be set to reside somewhere in the margin between the first and second sets of measured signal strengths. Of course, it would be possible to obtain only the first set of measured signal strengths and set the predetermined threshold value slightly less than the lowest measured signal strength. In a wireless LAN having more than one access point, the process would be repeated to determine a predetermined threshold value for each access point.

Figure 4:
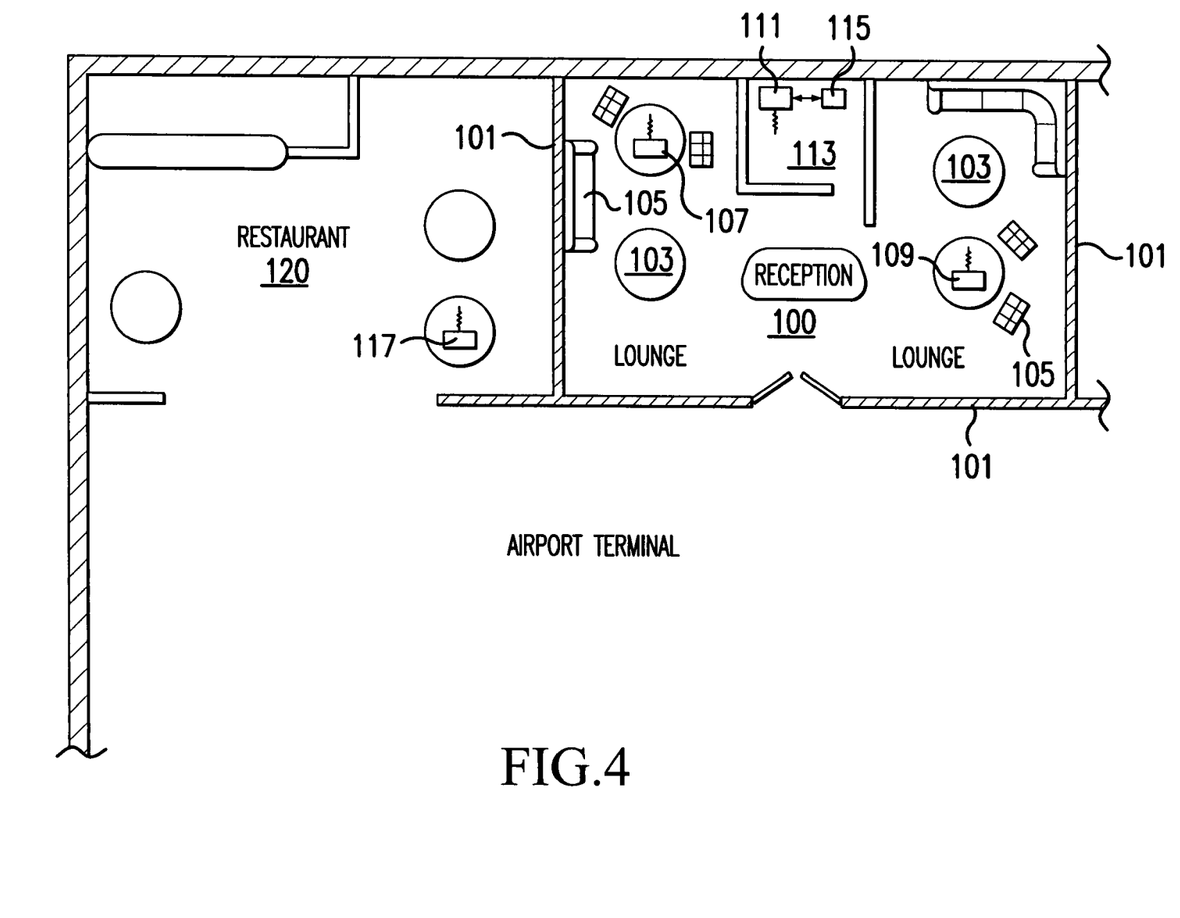
FIG. 4 is a floor plan of an airport lounge employing the wireless LAN.

Some airlines offer a lounge at an airport terminal, which has a wireless LAN. Waiting passengers can access the wireless LAN using their own laptop, or can use a laptop supplied by the lounge attendant. FIG. 4 is a floor plan for a wireless LAN, in accordance with the present invention, employed in a lounge area of an airport. FIG. 4 also illustrates a wireless LAN which does not include a local server.

In FIG. 4, a lounge 100 is defined by structural walls 101. In the lounge 100, there are a plurality of tables 103 and seats 105, such as chairs and couches. Travelers, relaxing or working in the lounge, can operate portable wireless stations, such as a fifth station 107 and a sixth station 109. The fifth and sixth stations 107 and 109 communicate with a third access point 111, positioned inside of an attendant's area 113. The third access point 111 is hardwired to a personal computer 115.

In the arrangement of FIG. 4, it is an object of the present invention to discriminate the authorized fifth and sixth stations 107 and 109, inside the lounge 100, from an unauthorized, seventh station 117 in a restaurant 120 outside of the lounge 100. The present invention would classify the seventh station 117 in the restaurant 120 as an unauthorized station, via the method of FIG. 3. Therefore, the seventh station 117 would be denied access to the wireless LAN established in the lounge 100.

FIG. 4 illustrates that the present invention is applicable to situations wherein only a portion of a building, instead of an entire building, is defined as the authorized geographical area of the wireless LAN. In FIG. 4, the authorized geographical area is defined within interior walls 101 of an airport terminal. It should be noted that it is within the scope of the present invention to establish an authorized geographical area which is not defined by walls, but merely a radius from the access point.

It is also an object of the present invention to verify that authorized stations remain within the authorized geographical area. This prevents an unscrupulous hacker from briefly entering the authorized geographical area, establishing a connection to the wireless LAN, and then leaving the authorized geographical area while maintaining the connection to the wireless LAN. For example, a hacker could conceal a laptop computer in a briefcase and walk into a business, under the premise of asking directions to a nearby building. Once inside the business, the laptop could be automatically programmed to connect to the wireless LAN. Since the laptop would actually be within the authorized geographical area, a sufficient signal strength would be present, and the method of FIG. 3 would characterize the station (e.g. laptop) as an authorized station. After the hacker leaves the business, the hacker could sit in the parking lot and access the wireless LAN.

Figure 5:
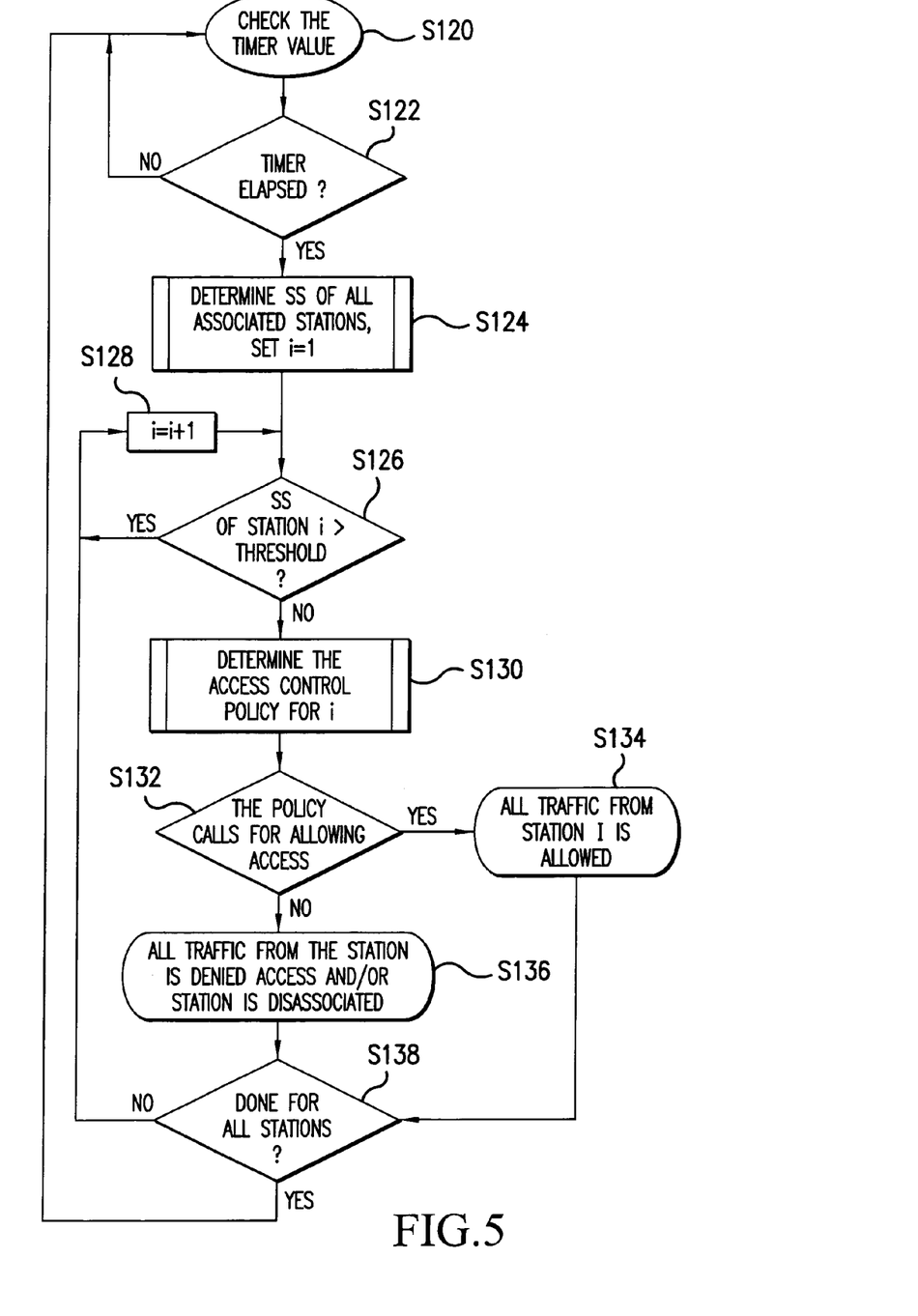
FIG. 5 is a flow chart illustrating a method for verifying that wireless stations on the wireless LAN remain within a predefined geographical service area.

FIG. 5 is a flow chart illustrating a method of ensuring that authorized stations on the wireless LAN remain within the authorized geographical area. In step S120, the control unit 11 checks a timer value. The timer value could be an internal clock of a CPU of the control unit 11, or any other timing device. In step S122, it is determined if the timer value has elapsed, or if a designated time period has passed. If not, the process returns to step S120.

If the timer has lapsed, the process continues to step S124. In step S124, a signal strength of all of the stations on the wireless LAN is measured. Also in step S124, a total number of the stations on the wireless LAN is noted and a variable "i" is set equal to 1. Then, the process goes to step S126.

In step S126, the signal strength (SS) of the station (i), e.g. the first station on the wireless LAN, is compared in the predetermined threshold value stored in the memory 13. If the signal strength exceeds the predetermined threshold value, the process goes to step S128.

In step S128, the variable "i" is incremented and the process returns to step S126. Therefore, the next station's signal strength, e.g. the second station's signal strength, is compared to the predetermined threshold value. If a station's signal strength is less than the predetermined threshold value, the method goes to step S130.

In step S130, the control unit evaluates an "access control policy" stored in the memory 13. The access control policy sets the standards for dealing with a station which passes outside of the authorized geographical area. There can be a universal access control policy for all stations. However, in a preferred embodiment, different stations, as identified by their unique key codes, are treated differently when they pass outside of the authorized geographical area. For example: (1) certain stations could be seamlessly operated outside of the authorized geographical area; (2) certain stations could be provided with a warning signal causing a display indicting that the user should return to the authorized geographical area; (3) certain stations could be allowed to continue a data transfer which is in progress, but be foreclosed from initiating any new data transfer; (4) certain stations could be allowed restricted access (e.g. only certain programs on the server could be accessed); (5) a timer could be started which allows certain stations to function in a normal manner for a period of time sufficient to allow the station to return to the authorized geographical area; (6) certain stations could be immediately denied further access to the wireless LAN and/or not associated with the wireless LAN, such as by sending a de-authentication notification to the station. The de-authentication notification would reset the station's state variables, such that the station would be unassociated with the wireless LAN, in accordance with the 802.11 standards. Denying access to the wireless LAN would be transparent to the station (e.g. the station would not receive a transmission from the wireless LAN and hence would not "know" that access had been denied). Sending a de-authentication notification would not be transparent to the station.

It would also be possible to provide different timer values for different stations. In other words, each station could have its own unique timer value. A check would be made to see if a particular station had left the authorized geographical area after the lapse of the timer value associated with that particular station. For example, one station would be checked every three minutes, while another station would be checked every ten minutes.

Step S132 illustrates the situation when policies (1) and (6) are in place. In Step S132, if the policy associated with the particular station outside of the authorized geographical area calls for policy (1), processing proceeds to step S134. In step S134, the station is allowed to seamlessly remain on the wireless LAN. If the policy associated with the particular station outside of the authorized geographical area calls for policy (6), processing proceeds to step S136. In step S136, the station is denied further access to the wireless LAN and/or the station is not associated.

After either of step S134 or step S136, the process goes to step S138. In step S138, the control unit 11 checks to see if the last station on the wireless LAN has been evaluated. If not, the variable "i" is incremented in step S128, and the next station is evaluated. If so, the process returns to step S120 and waits for a period. After, the period lapses, the control unit again reevaluates all of the stations on the wireless LAN. The period of steps S120 and S122 may be selectively set by the installer or end user, e.g., three minutes, 30 seconds.

By the present invention, it is possible to define an authorized geographical area, inside of which stations can connect to a wireless LAN and outside of which stations cannot connect to the wireless LAN. The geographical area can be inferred by relying on a measured signal strength of the station seeking a connection to the wireless LAN. This method can be very accurate since walls, especially outside walls, tend to greatly weaken or attenuate wireless signals. Thus, it is possible to discriminate between authorized stations within certain walls and unauthorized stations outside of those walls. This arrangement counteracts the "parking lot scenario," wherein an unauthorized person gains access to a wireless LAN, while sitting in a car parked adjacent to a business, hotel, person's house, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of operating a wireless local area network comprising the steps of:
   receiving a request from a wireless station at an access point of the wireless local area network;
   determining if a location of the wireless station is within a predefined geographical area;
   if the location is within the predefined geographical area, allowing the wireless station to access the wireless local area network; and
   if the location is outside the predefined geographical area, denying the wireless station access to the wireless local area network, wherein said step of determining includes the steps of:
      measuring a signal strength of the wireless station as received by the access point of the wireless local area network; and
      comparing the signal strength to a predetermined threshold value, wherein the predetermined threshold value is set such that reliable signals could be received at the access point from the wireless station with a signal strength less than the predetermined threshold value, however signal strengths less than the predetermined threshold value received at the access point are assumed to come from an unauthorized wireless station outside the predefined geographical area and are denied access to the wireless local area network.

2. The method according to claim 1, further comprising the steps of:
checking a key code transmitted by the wireless station after said step of allowing the wireless station to access the local area network;
if the key code matches a preset key code, allowing the wireless station to utilize one or more services provided on the wireless local area network; and
if the key code fails to match a preset key code, denying the wireless station access to utilize services provided on the wireless local area network.

3. The method according to claim 1, further comprising the step of:
periodically verifying that all wireless stations accessing the wireless local area network remain within the predefined geographical area.

4. The method according to claim 3, wherein if a wireless station moves outside of the predefined geographical area, activating a control policy regarding permitting continued access to the wireless local area network for the wireless station outside the predefined geographical area.

5. The method according to claim 4, wherein the control policy includes denying the wireless station outside the predefined geographical area access to the wireless local area network.

6. The method according to claim 5, wherein the control policy also includes resetting state variables stored in a memory of the wireless station outside the predefined geographical area.

7. The method according to claim 4, wherein the control policy includes determining if a data transfer is in progress between the wireless local area network and the wireless station, and if so, continuing the data transfer until completion, and then denying the wireless station outside the predefined geographical area access to the wireless local area network.

8. A system comprising:
an access point for receiving a wireless request from a wireless station;
a control unit for determining if a location of the wireless station is within a predefined geographical area; and
a router or bridge for providing the wireless station access to a wireless local area network, if the wireless station is within the predefined geographical area, wherein said control unit includes:
a signal strength measuring device for measuring a signal strength of a signal received by said access point from the wireless station, and wherein said system further comprises:
a memory storing a predetermined threshold value, and wherein said control unit includes a comparator for comparing a measured signal strength received by said access point from the wireless station to said predetermined threshold value, wherein said predetermined threshold value is set such that reliable signals could be received at said access point from said wireless station with a signal strength less than said predetermined threshold value, however signal strengths less than said predetermined threshold value received at said access point are assumed to come from an unauthorized wireless station outside the predefined geographical area and are denied access to the wireless local area network.

9. The system according to claim 8, wherein said control unit also includes:
a timer, wherein said control unit monitors said timer, and after a predetermined time, said control unit determines if a location of the wireless station remains within the predefined geographical area.

10. A system comprising:
a wireless station;
an access point receiving a wireless request from said wireless station;
a control unit determining if a location of said wireless station is within a predefined geographical area; and
a router or bridge for providing said wireless station access to a wireless local area network, if said wireless station is within the predefined geographical area, wherein said control unit includes:
a signal strength measuring device for measuring a signal strength of a signal received by said access point from said wireless station, and wherein said system further comprises:
a memory storing a predetermined threshold value, and wherein said control unit includes a comparator for comparing a measured signal strength received by said access point from the wireless station to said predetermined threshold value, wherein said predetermined threshold value is set such that reliable signals could be received at said access point from said wireless station with a signal strength less than said predetermined threshold value, however signal strengths less than said predetermined threshold value received at said access point are assumed to come from an unauthorized wireless station outside the predefined geographical area and are denied access to the wireless local area network.

11. The system according to claim 10, wherein said control unit also includes:
a timer, wherein said control unit monitors said timer, and after a predetermined time, said control unit determines if a location of said wireless station remains within the predefined geographical area.

12. A method of setting up a wireless local area network comprising the steps of:
providing an access point for transceiving communications with wireless stations inside a predefined geographical area;
operating a wireless station within the predefined geographical area, which is smaller than an area which could be reliably served by the access point;
measuring signal strengths received at the access point from the wireless station, as the wireless station is moved about within the predefined geographical area;
setting a predetermined threshold value at an amount less than the lowest measured signal strength; and
storing the predetermined threshold value in a memory, wherein the predetermined threshold value is set such that reliable signals could be received at the access point from the wireless station with a signal strength less than the predetermined threshold value, however signal strengths less than the predetermined threshold value received at the access point are assumed to come from an unauthorized wireless station outside the predefined geographical area and are denied access to the wireless local area network.

13. The method according to claim 12, further comprising the steps of:
uniquely identifying a first wireless station to communicate with the access point; and
storing a first control policy in the memory to deal with the first wireless station, wherein the first control policy includes parameters for handling communications between the access point and the first wireless station when the first wireless station moves outside of the predefined geographical area.

14. The method according to claim 13, further comprising the steps of:
uniquely identifying a second wireless station to communicate with the access point; and
storing a second control policy in the memory to deal with the second wireless station, wherein the second control policy includes parameters for handling communication between the access point and the second wireless station when the second wireless station moves outside of the predefined geographical area, wherein the second control policy is different from the first control policy.

* * * * *